United States Patent
Cheng et al.

(10) Patent No.: US 7,530,110 B2
(45) Date of Patent: May 5, 2009

(54) SYSTEM AND METHOD FOR FUZZY MULTI-LEVEL SECURITY

(75) Inventors: Pau-Chen Cheng, Yorktown Heights, NY (US); Shai Halevi, Elmsford, NY (US); Trent Ray Jaeger, Croton-on-Hudson, NY (US); Paul Ashley Karger, Chappaqua, NY (US); Ronald Perez, Mount Kisco, NY (US); Pankaj Rohatgi, New Rochelle, NY (US); Angela Marie Schuett, Columbia, MD (US); Michael Steiner, New York, NY (US); Grant M. Wagner, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 11/123,998

(22) Filed: May 6, 2005

(65) Prior Publication Data

US 2006/0253709 A1     Nov. 9, 2006

(51) Int. Cl.
    *H04K 1/00*         (2006.01)
    *H04L 9/00*         (2006.01)
    *H04L 9/32*         (2006.01)

(52) U.S. Cl. .......................................... 726/26; 713/182
(58) Field of Classification Search .................. 726/26; 713/182
See application file for complete search history.

(56) References Cited

U.S. PATENT DOCUMENTS 6,430,561 B1 *   8/2002   Austel et al. ................... 707/9
7,197,427 B2 *   3/2007   Noonan et al. .............. 702/179

OTHER PUBLICATIONS

J.-S.R. Jang, "Fuzzy Sets", Chapter 2; 1997; pp. 13-17 and 28.
S.N. Chari et al, "BlueBox: A Policy-Driven, Host-based Intrusion Detection System", ACM Transactions on Information and System Security, vol. 6. No. 2, May 2003, pp. 173-200.
David E. Bell et al., "Computer Security Model: Unified Exposition and Multics Interpretation", Technical Report ESD-TR-75-306, The Mitre Corp, Bedford, MD Jun. 1975, pp. 1-134.

* cited by examiner

*Primary Examiner*—Kambiz Zand
*Assistant Examiner*—Aubrey H Wyszynski
(74) *Attorney, Agent, or Firm*—Keusey, Tutunjian & Bitetto, P.C.; Joseph Jones (57) ABSTRACT

An access control system and method includes a risk index module which computes a risk index for a dimension contributing to risk. A boundary range defined for a parameter representing each risk index such that the parameter above the range is unacceptable, below the range is acceptable and in the range is acceptable with mitigation measures. A mitigation module determines the mitigation measures which reduce the parameter within the range.

1 Claim, 7 Drawing Sheets

SYSTEM AND METHOD FOR FUZZY MULTI-LEVEL SECURITY

GOVERNAMENTAL RIGHTS

This invention was made with Governmental support under Contract No. TIA H98230-04-3-0001 awarded by U.S. Department of Defense. The Government has certain rights in this invention.

BACKGROUND

1. Technical Field

The present invention relates to system security for computer related devices, and more particularly to models based on fuzzy logic for multiple security levels.

2. Description of the Related Art

The traditional multi-level secure (MLS) mandatory access control is based on the Bell-LaPadula model (See, David E. Bell and Leonard J. LaPadula; "Computer Security model: Unified Exposition and Multics Interpretation"; Technical Report ESD-TR-75-306, The MITRE Corporation, Bedford, Mass., HQ Electronic Systems Division, Hanscom AFB, Mass., June 1975), where each subject or object is tagged with a <sensitivity level (SL), categories set (CS)> tuple. All such tuples in a system form a partial-order relation set where $<SL_1,CS_1> \geqq <SL_2,CS_2>$ if and only if $SL_1 \geqq SL_2$ and $CS_1 \supseteq CS_2$. Information can flow from a source to a destination only if $tag_{destination} \geqq tag_{source}$; the source or destination can be either a subject or object. So a subject can read an object only if $tag_{subject} \geqq tag_{object}$. A subject is usually a person or an application running on behalf of a person; its sensitivity level reflects the degree of trust placed on the subject; its categories set specifies the categories of objects the subject has a need to know or to access. A subject's sensitivity level is also called the subject's clearance.

An object is usually a data storage element such as a file or data transportation apparatus such as a network connection; its sensitivity level indicates how sensitive the data are or the magnitude of the damage incurred by an unauthorized disclosure of the data; its categories set specifies the categories to which the data belong.

This kind of traditional MLS model is a time-honored tradition that has been in practice since before computers came into wide existence. The model is easy to understand, and is also easy to make access control decisions based on the model by simply comparing two tags. If the tags associated with a subject and an object correctly reflect the subject's trustworthiness, need-to-know and the object's sensitivity and categories, then the access control decision is likely to avoid leakage of the information in the object and therefore the risk associated with such leakage. In short, the model is geared toward risk avoidance.

The traditional MLS model does have some drawbacks, however. Especially in today's environment where the need for information is ever greater, a subject may not be associated with a proper tag that would grant access to those objects which are needed to complete a job. Since a subject's tag reflects the degree of trust placed on the subject, it would be a bad practice to dynamically adjust the tag to a particular job. In other words, the policy model may not be flexible enough to permit a system or an organization to fulfill its goals and responsibilities.

SUMMARY

A policy model based on sensitivity levels and need-to-know is disclosed in accordance with preferred embodiment of the present invention. This model may be referred to as a fuzzy MLS model or fuzzy model, for ease of reference, but should not be limited by such terminology. The fuzzy MLS model preferably provides risk-based access control.

One aspect of this fuzzy MLS model is to make access control decisions based on the perceived level of potential risk associated with the requested access. Instead of a binary, allow/deny decision, an access control decision from the fuzzy MLS model would be one of "allow", "deny", or "allow but with certain risk mitigation measures to be taken against the access". Depending on the perceived levels of risk, different risk mitigation measures may be applied for different accesses. This fuzzy MLS model enables non-binary, versatile, fine-grained access control decisions to meet demands while keeping the risk in check.

The fuzzy model does so by removing the constraint(s) imposed by the binary input to the decision process: if the partial order relationship holds.

It may seem that this fuzzy model is difficult to realize because it needs quantification of the risk associated with an access which would in turn need accurate prediction of future events that are results of or relevant to the access. While it is generally impossible to predict the future accurately, one can usually estimate the risk associated with an action. For example, insurance companies determine premiums by estimating risk; we often choose to avoid entering a dark alley at night. Likewise, the fuzzy MLS model estimates risk using the subject's and the object's tags and decides the course of action based on the estimate. Given the fact that there is, and always will be only a limited amount of resources to protect information technology (IT) systems and information in them, an illustrative goal of the fuzzy MLS model may be to deliver reasonable access control decisions in the sense that more resources are applied to security in more risky situations, and therefore reduce the likelihood of severe damages and catastrophic events and increase the chance of well-being and survival.

An access control system and method includes a risk index module which computes a risk index for a dimension contributing to risk. A boundary range defined for a parameter representing each risk index such that the parameter above the range is unacceptable, below the range is acceptable and in the range is acceptable with mitigation measures. A mitigation module determines the mitigation measures which reduce the parameter within the range.

An access control system and method includes a risk index module which computes the risk index for each dimension contributing to risk. A transformation module converts the risk index into a probability for each dimension. A boundary range is defined for each probability for each dimension such that a probability above the range is unacceptable, below the range is acceptable and in the range is acceptable with mitigation measures. A mitigation module determines the mitigation measures which reduce the probabilities within the range.

A joint probability can be computed by combining probabilities from all the dimensions and a boundary range can also be defined in terms of the joint probabilities. A boundary range can also be defined in terms of risk indices for a dimension such that an index above the range is unacceptable, below the range is acceptable and in the range is acceptable with mitigation measures.

Since the transformation from risk indices to probabilities may be a one-to-one mapping (e.g., a larger risk index is transferred to a higher probability) risk indices can be used to define per-dimension boundary ranges in a way similar to defining boundary ranges in terms of probabilities.

A method for making access control decisions includes computing a risk index for a plurality of dimensions which contribute to risk. A probability is computed for each dimension for the risk index. A determination is made as to whether the probability falls with a boundary range defined for the probability for each dimension such that probabilities above the range are unacceptable, below the range are acceptable and in the range are acceptable with mitigation measures.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFFERED EMBODIMENTS

Embodiments of the present invention provides models for multi-level security policy such that access control decisions are not simply binary allow/deny decisions based on the traditional partial order relations between <sensitivity/clearance level, category sets> pairs but on a continuous range of risk indices. In one embodiment, sensitivity/clearance levels are not discrete levels, but a continuous range of positive real numbers. Category sets may be replaced by the relevance to a category concept, which is also represented by numbers.

Embodiments of the present invention are based on fuzzy logic, e.g., from fuzzy logic/set theory described in *Neuro-Fuzzy AND Soft Computing: A Computational Approach to Learning and Machine Intelligence* by Jyh-Shing Roger Jang, Chuen-Tsai Sun and Eiji Mizutani, Prentice Hall, 1997. One aspect of this new model is to provide much more flexible access control than that provided by the traditional MLS, but yet still maintain adequate security.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The methods as described herein may be implemented or used on an integrated circuit chip(s).

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

A fuzzy MLS model aims to control access to information by managing the risk associated with such accesses. To this end, the risk may be defined as the expected value of loss incurred by unauthorized disclosure of information:

$$\text{risk} = (\text{value of information}) \times (\text{probability of unauthorized disclosure}) \quad (1)$$

The "value" of a piece of information is defined to be the value of loss when the piece of information is disclosed in an unauthorized manner. The unit of "value" may be defined in accordance with the circumstances and assume that the value can be defined for a particular application scenario and environment. A further assumption is that in general there is a way to give at least a reasonable estimate of the value, or the upper bound of it.

One difficulty is in determining the probability of unauthorized disclosure. A precise determination is generally impossible since that would require a precise prediction of future events that are relevant to accesses to the information. Instead, the fuzzy MLS model strives to develop a way to assign such probabilities that are commensurate with common sense and intuition of which a large part actually comes from prior research done on the traditional MLS model. For example, the probability should be very high when a person without security clearance is given access to top secret information, but relatively low if the access is given to a person with a top secret clearance. However, the problem is much more difficult than the example.

The difficulties may include the following. There are many dimensions contributing to the risk; examples are sensitivity and clearance levels, categories and need-to-know, etc. These dimensions are usually not orthogonal to one another yet the exact relationship among them cannot be known. Therefore, their joint probability distribution cannot be known in general. One reason for estimating the risk is to determine if the risk is too high and therefore to mitigate the risk. If only a quantified risk estimate is available, it would be difficult to determine the major contributing dimensions to the risk and therefore the proper mitigation measures.

In addition, all probabilities have to be in [0, 1], this may not provide enough resolution to differentiate between different levels of risk. This is especially so given the fact that the probabilities are estimates at best. For example, a 0.01 difference in probability may not lead to a significant enough difference to alter a decision in practice.

Figure 1:
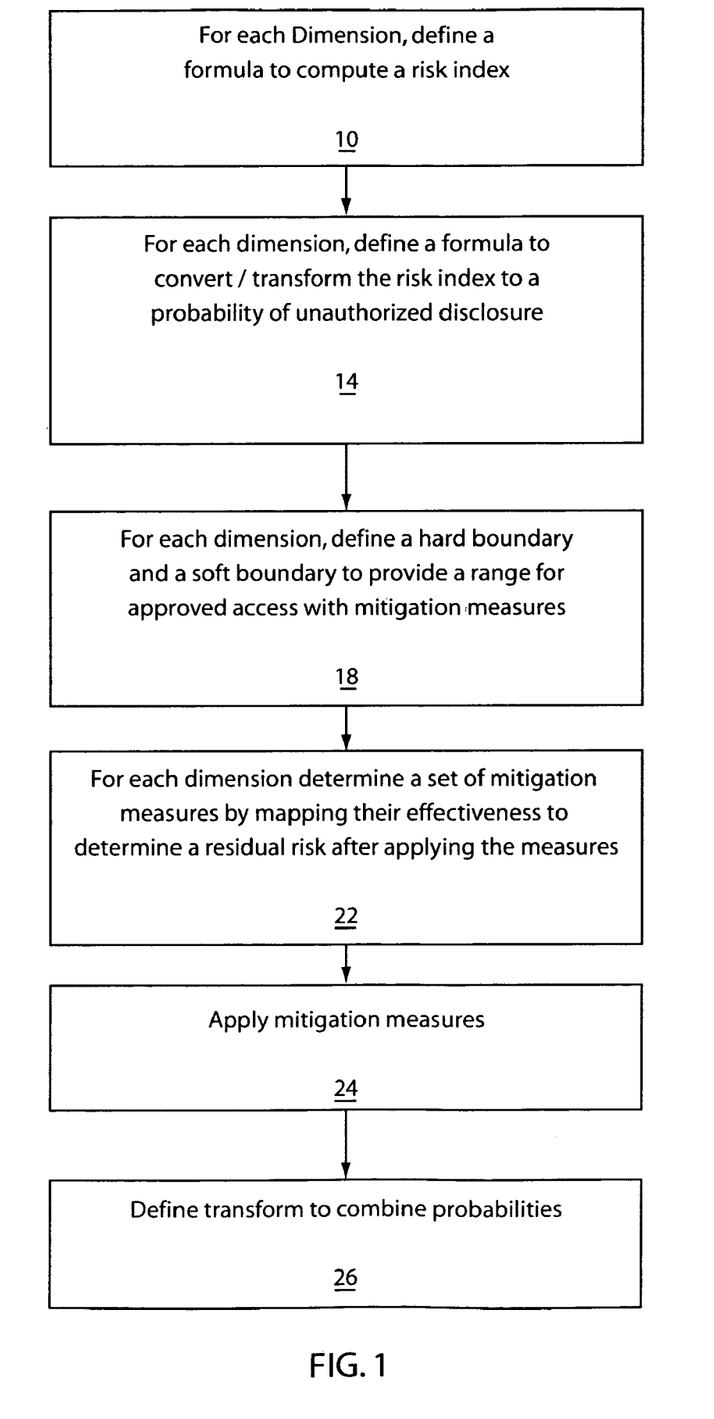
FIG. 1 is a block/flow diagram showing an overall method for access control which includes mitigation options in accordance with one embodiment.

Referring now to the drawings in which like numerals represent the same or similar elements and initially to FIG. 1, a block/flow diagram shows a method for approximating risk and making an access control decision in accordance with embodiments of the present invention.

The following approach may be used to address the difficulties cited above and to produce an approximation of risk as defined by formula (1). In block 10, for each dimension contributing to the risk, define a formula that computes risk indices that are commensurate with intuition such that a larger index indicates a higher chance of unauthorized disclosure. For example, define a formula to compute a risk index from sensitivity levels. The risk of information flow from an object's sensitivity level to a subject's clearance level may be defined so that the index increases when the sensitivity level increases or when the clearance level decreases. The range of risk indices is $(0; +\infty)$. The risk indices are always greater than zero to reflect the fact that there is always some risk, however small it may be.

The index is not capped to provide greater resolution on risk levels. Risk indices are relative measurements of risk. To make them useful, they need to be calibrated as described in the next step in block 14.

In block 14, for each dimension, define another formula to convert a risk index into the probability of unauthorized disclosure. The formula should be monotonically increasing with respect to the risk indices. It is preferable that the formula includes tunable parameters so that they can be fine-tuned to approximate statistics or intuition. This formula and calibration image a random process that takes a risk index as input and produces a Boolean output to indicate if an unauthorized disclosure happens. This formula may be labeled $Prob_D$ for a dimension D.

If RI is a risk index, then $Prob_D(RI)$ = probability of unauthorized disclosure due to RI  (2)

The requirements for $Prob_D$ are:

$\lim_{RI \to 0+} Prob_D(RI) = 0$ $\lim_{RI \to +\infty} Prob_D(RI) = 1$ $RI_1 > RI_2 \Rightarrow Prob_D(RI_1) > Prob_D(RI_2)$ The first requirement can be relaxed to $\lim_{RI \to 0+} Prob_D(RI) \approx 0$ for some operations.

In block 18, for all dimensions, a Hard Boundary (HB) and a Soft Boundary (SB) are defined for risk indices such that risk beyond the HB is not acceptable and an access request should be denied and risk below the SB is acceptable. The range between the HB and the SB is a large component of the flexibility provided by the fuzzy MLS model.

In block 22, for each dimension, determine a set of risk mitigation measures and their effectiveness such that the effectiveness of a measure m as a mapping $e_m$ from a risk index RI to another risk index can be established as:

$e_m(RI)$ = (Residual risk index after applying m)  (3)

$e_m(RI)$ should be less than RI but greater than zero.

The process of determining risk mitigation measures and their effectiveness is likely to need human involvement or at least human supervision. There is likely to be a set of general risk mitigation measures that can be applied to all dimensions; although the effectiveness of a measure may differ in different dimensions. The goal of risk mitigation measures is to bring risk between HB and SB down an acceptable level: to be below SB.

Mitigation measures may be applied in block 24 to reduce the considered risks.

In block 26, define a transformation to combine probabilities from different dimensions to approximate their joint probability distribution. It would be preferred that the transformation includes tunable parameters so the parameters can be fine tuned to approximate statistics or intuition. More details of the probability formulas and transformations will be given below.

Figure 2:
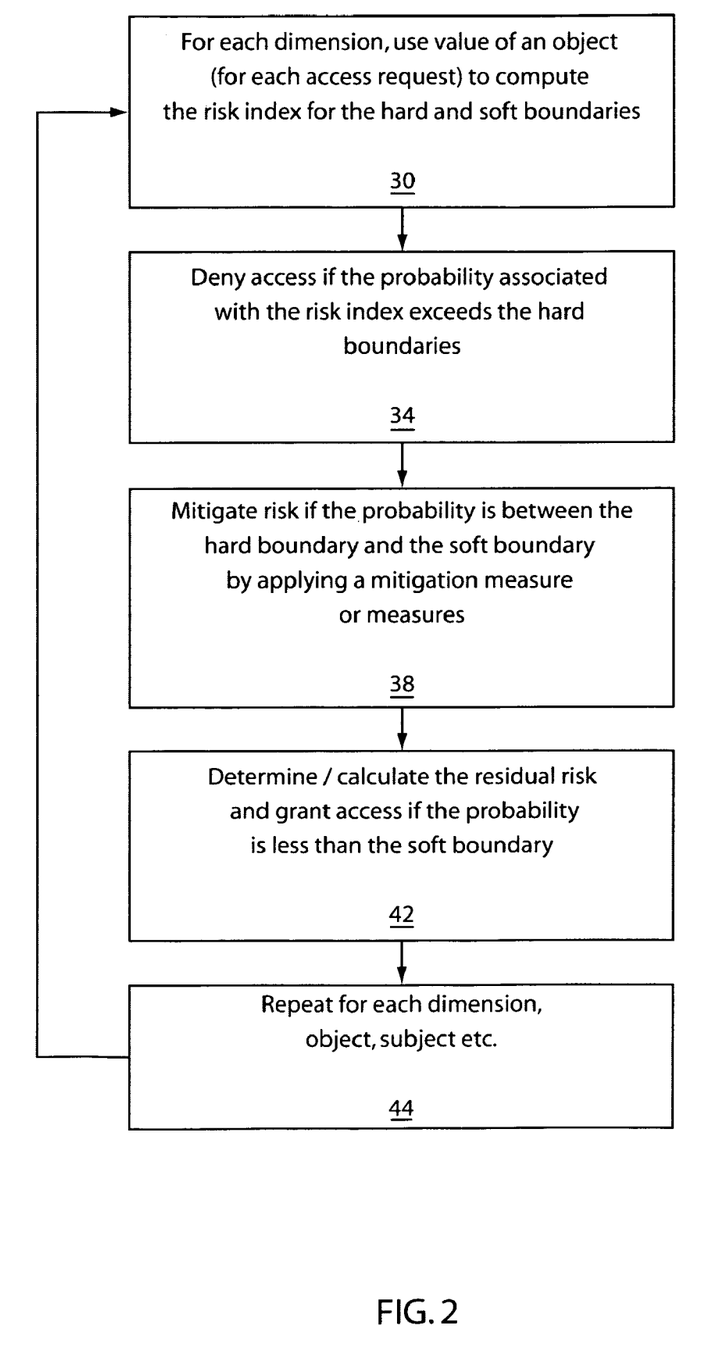
FIG. 2 is a block/flow diagram showing a system/method for access control in accordance with an illustrative embodiment.

It should be noted that the steps for the assessment of risk as described above may be applied independently of the decision assessment steps as outlined below. Using the approach described above, an access control decision can be made in the following ways:

Referring to FIG. 2, in block 30, for each dimension D, using the value of the object to which access is requested to compute two risk indices, $RI_{HB \cdot D}$ and $RI_{SB \cdot D}$ that correspond to the HB and SB through the following inequality:

(value of the object)$\times Prob_D(RI) >$ Boundary  (4)

This step may seem cumbersome because it may be performed for every dimension for every access request. However, through careful selection and design of the formulas for computing risk indices, it is possible to use the same formula for $Prob_D$ for all dimensions.

Also, a practical system is most likely to quantize the value of objects to a finite set of levels. Therefore, the computation of $RI_{HB \cdot D}$ and $RI_{SB \cdot D}$ could be done off line a priori and an on-line operation would only need to do a table look-up.

In block 34, deny access if the risk index in any dimension D is beyond $RI_{HB \cdot D}$.

In block 38, bring the risk in each dimension down to below the corresponding $RI_{SB \cdot D}$ by applying risk mitigation measures. In practice, it is likely that a general risk mitigation measure applied to one dimension will have an effect on all dimensions.

In block 42, evaluate formula (1) to see if the residual risk is still too high and grant the access only if the risk can be brought down to an acceptable level by some additional risk mitigation measures.

Embodiments of the present invention can be applied to many kinds of dimensions. For example, two kinds of dimensions, the kind characterized by sensitivity and clearance levels and the kind characterized by categories and need-to-know, will be illustratively described in accordance with this disclosure. However, the present invention should not be construed as limited by the illustrative examples.

Figure 3:
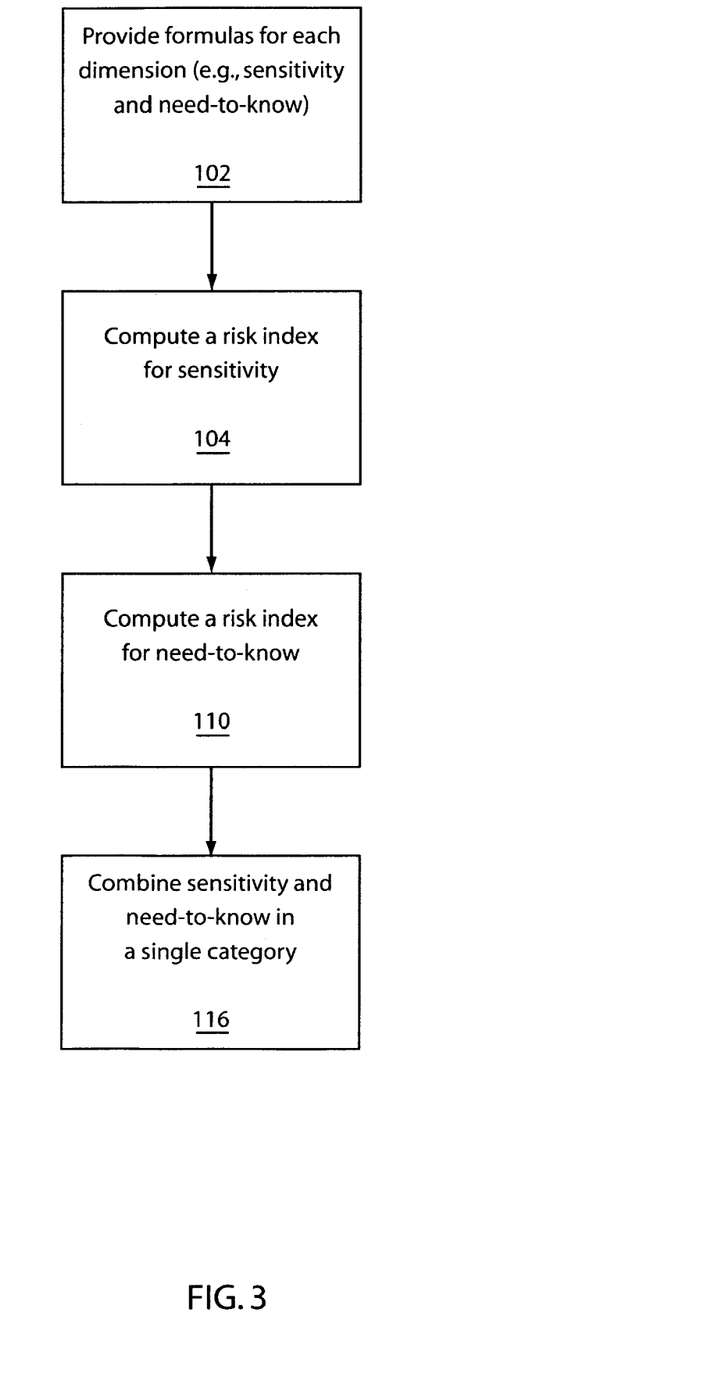
FIG. 3 is a block/flow diagram showing two dimension combined into a single category.

Referring to FIG. 3, a method for computing risk indexes and combining risk indexes is illustratively shown for one exemplary embodiment. In block 102, formulas that compute risk indices for dimensions, e.g., from sensitivity levels and from need-to-know, are provided. Intuition behind these formulas and how they are derived will be discussed hereinafter; as well as, how to combine risk indices from multiple dimensions into a single risk value.

In block 104, a risk index is computed from sensitivity levels, preferably by using a formula that computes the risk index of an information flow based on the sensitivity levels of a subject and an object. The symbols sl and ol will be employed with optional subscripts to represent the sensitivity levels of a subject and an object respectively.

The formula may be described in terms of a function $RI_{SL}$(sl, ol) which takes a subject's and an object's sensitivity levels as parameters and computes a risk index on information flow from the object to the subject. For ease of discussion and analysis, sl, ol and $RI_{SL}$(sl, ol) are all positive real numbers and a smaller number represents a lower level of sensitivity or a lower level of risk. This restriction should be reasonable and is consistent with the current practice of implementing MLS systems. There could be countless many ways to define $RI_{SL}$; but any definition should satisfy the following properties:

1) The less trustworthy a subject is, the higher the risk index.

$$\text{For any } ol, sl_1 < sl_2 => RI_{SL}(sl_1, ol) \geq RI_{SL}(sl_2, ol) \tag{5}$$

2) The more sensitive an object, the higher the risk index.

$$\text{For any } sl, ol_1 > ol_2 => RI_{SL}(sl, ol_1) \geq RI_{SL}(sl, ol_2) \tag{6}$$

A definition of the function $RI_{SL}$ may include the following. Let $S \equiv [1, S_{max}]$: the set of all allowed values for sl. (1 is chosen for the left bound to avoid division by zero)
$O \equiv [1, O_{max}]$: the set of all allowed values for ol.
R+: the set of all positive, non-zero real numbers.
a: $a \in R^+$, a>1.
m: $m \in R+$, $m > S_{max}$, $m > O_{max}$. Then $RI_{SL}$ is a function from S×O to $R^+$:

$$RI_{SL}(sl, ol) \equiv (a^{-(sl-ol)})/(m-ol) \tag{7}$$

Risk indices values may be calculated based on formula 7 or any other suitable formulas. How formula 7 is derived and the physical meaning of an ol (or sl) as the log of the object value or the trustworthiness of the subject, we be described in greater detail below. However, one useful form of ol and sl includes:

$$ol = \log_a(\text{object value}); sl = \log_a(\text{subject trustworthiness})$$

It is pessimistically assumed that every person has a price and the trustworthiness of a subject is expressed in terms like: "This person can be trusted with no more than 10,000." There are certainly many other possible ways to define $RI_{SL}$, but formula 7 has some desirable properties which would be beneficial for any definition of $RI_{SL}$. $RI_{SL}$ is a simple, analytical and continuous function; simple analysis can show that it not only satisfies formulas 5 and 6 but also provides benefits over S×O that are consistent with the intuitions on sensitivity levels. For example:

The more sensitive an object, the higher the maximum risk index.

$$ol_1 > ol_2 => RI_{SL}(1, ol_1) > RI_{SL}(1, ol_2)$$

The risk index is always greater than 0.

$$RI_{SL}(sl, ol) > 0 \text{ over } S \times O.$$

This implies that a subject's access to an object always carries some risk even if the subject is very trustworthy. It would be a policy decision that some risk mitigation measures should be taken in this case.

Another benefit of formula 7 includes:

The more sensitive an object is, the faster the risk index increases as sl decreases.

$$ol_1 > ol_2 =>$$

$$0 > \partial RI_{SL}(sl, ol_2)/\partial sl > \partial RI_{SL}(sl, ol_1)/\partial sl \tag{10}$$

For a constant difference (sl−ol), the risk index increases as ol increases.

$$RI_{SL}(sl_1, ol_1) > RI_{SL}(sl_2, ol_2) \text{ if } ol_1 > ol_2 \text{ and}$$

$$(sl_1 - ol_1) = (sl_2 - ol_2) \tag{11}$$

The risk index is greater than (m−ol) if sl<ol, it is less than (m−ol) if sl>ol and it equals (m−ol) if sl=ol. This property serves as the link to the traditional, Bell-LaPadula model based MLS policy in the sense that the Bell-LaPadula model is violated if the risk index is greater than (m−ol).

A determination is made as to risk and mitigation of the risk based on sensitivity. In formula 7, the values of ol may be restricted to be less than m. The intuition of m is this: If the sensitivity of an object is close to or greater than m, then any access to this object ought to be considered extremely risky and be handled with extreme care; it may imply extreme risk mitigation measures such as complete physical isolation of the object, subject and IT systems or constant human supervision as one form of mitigation. Note that $\lim_{ol \to m} RI_{SL}(sl, ol) = +\infty$. Such a large risk index does not necessarily imply denying access to an object. It may, however, force special attention and caution when making the access control decision.

In block 110, risk index is computed based on need-to-know. This includes a new category and relevance model being developed that is derived based on fuzzy set membership, and treats relevance like sensitivity.

Contrast this with, a traditional MLS system where need-to-know is represented by category sets. A subject has the need-to-know to an object if and only if the subject's category set is a superset of the object's category set. This is a binary decision since classical set membership is a binary relationship.

By the present disclosure, the category and relevance model considers a category to be an information category. An object's relevance to a category is a measure showing how relevant the information in the object is to the category. A subject's relevance to a category is a measure showing how strong a need the subject has to know the information in the category.

The difference between dealing with categories and dealing with sensitivity levels is that a subject or an object has one sensitivity level but may have relevance to more than one category. Dealing with sensitivity levels is a one-dimensional problem while dealing with categories is a multi-dimensional problem. Regardless of how many categories there are, a model is provided which can computer a risk index from a subject's relevance and an object's relevance when information flows from an object to a subject.

Taking a view that is consistent with the spirit of the Bell-Lapadula model:

Assuming there are n categories $C_1, C_2, \ldots C_n$ and the subject's and the object's relevance to the categories is represented as vectors $r_s = <r_{s1}, \ldots r_{sn}>$ and $r_o = <r_{o1}, \ldots r_{on}>$, then the risk should be low if $r_{si} >> r_{oi}$; $1 \leq i \leq n$ otherwise, the risk should be high.

In this sense, relevance is treated like sensitivity levels. An alternate view is to use the Euclidean distance between $r_s$ and $r_o$ as a measure of risk. In this view the following two cases are both considered risky $$r_{si} >> r_{oi} \text{ and } r_{si} << r_{oi}.$$

Alternate views will be discussed in greater detail below.

Using the Bell-Lapadula view, a formula $RI_{NK}$ may be defined to compute risk indices for a single category. Combined risk indices from sensitivity levels and multiple categories may be computed into a single risk value in block 116 and will be described in greater detail below.

Assuming that relevance to a category is in the range [1,M]; 1 means "totally irrelevant" and M means "the most relevant". Let $\epsilon$ be a small positive real number and $w_i$ be a positive real number, then for a category $C_i$, $$RI_{NK}(r_{si}, r_{oi}) = RI_{Ci} = w_i \times (r_{oi}/r_{si})/\log_{10}((M+\epsilon)/r_{oi}) \quad (12)$$

The range starts from 1 instead of 0 to avoid division by zero; it is also meant to avoid a large $RI_{NK}(r_{si}, r_{oi})$ value when $r_{oi}$ is small and $r_{si}$ is very small. The term "$\epsilon$" is meant to avoid division by zero. The denominator is meant to bias the risk index toward larger $r_{oi}$; $w_i$ is a per-category weight to emphasize or de-emphasize the importance of a category.

It should be noted that formula 12 could be considered another form of formula 7 if we choose a to be 10 and m to be $\log_{10}(M+\epsilon)$ in formula 7. Thus formula 12 retains the properties of formula 7.

Figure 4:
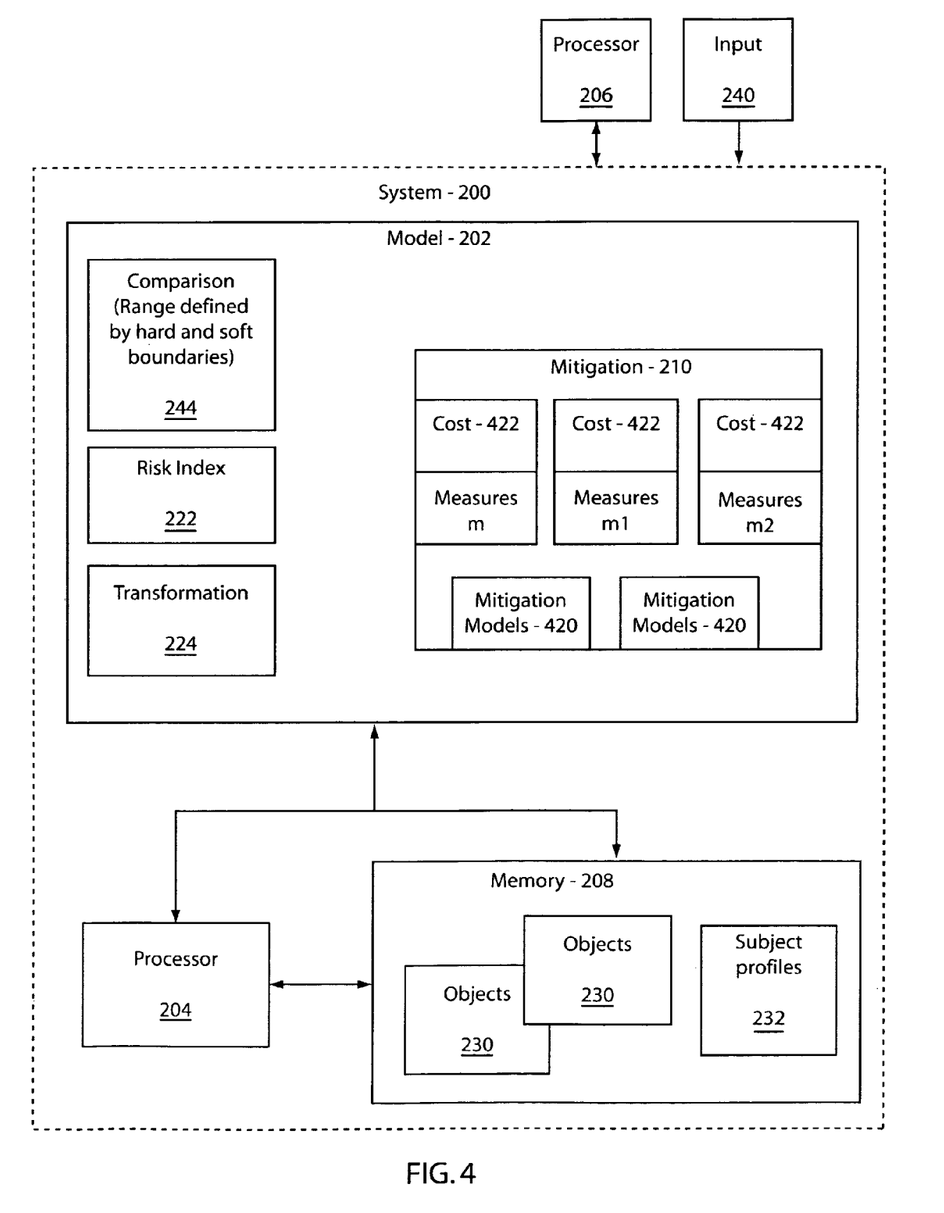
FIG. 4 is a block/flow diagram showing an access control system employing a fuzzy MLS model in accordance with an illustrative embodiment.

Referring to FIG. 4, an access control system 200 is illustratively shown in accordance with an embodiment of the present invention. Access control system 200 provides, determines or computes security risks based upon subjects (e.g., people or accounts) and objects (pieces of information) to determine or assess risk and to mitigate the risk by executing mitigation plans of steps.

System 200 includes a fuzzy MLS model 202, which is programmed into system 200. A risk index module 222 computes a risk index in accordance with the objects and the subjects for each risk dimension. A transformation module 224 converts the risk index into a probability for each risk dimension. Model 202 includes a boundary range which may be defined for a risk index for each risk dimension, a probability for each risk dimension, and/or a joint probability such that the parameter defined is compared to the boundary range. Parameter values above the range are unacceptable, below the range are acceptable and in the range are acceptable with mitigation measures.

A mitigation module 210 which determines the mitigation measures which provide a residual risk wherein the parameter values are within the range. Mitigation module 210 may also provide warnings to system administrators should changes occur or potentially risky behavior be exhibited.

System 200 may include a processor 204 for carrying out computations and works in conjunction with a memory 208. Memory 208 (or a separate secure memory) may store objects 230 and subject profiles 232. Objects 230 include any information that where access is limited. Subject profiles 232 may include information regarding limitations on access to the objects 230.

The Fuzzy MLS model 202 is NOT RESTRICTED to only sensitivity levels and need-to know, it can also take into account other risk-contributing factors such as information integrity, code integrity, or other risk-contributing factors (dimensions).

In one embodiment, an implementation chooses two finite, discrete sets $S_f$ and $O_f$ of allowed values of subject and object sensitivity levels (or relevance). Because $S_f$ and $O_f$ are finite and discrete, an off-line pre-computation can be done to compute the values of $RI_{SL}$ (and/or $RI_{NK}$) for every element in $S_f \times O_f$. This precomputation may be performed by a processor 204 in system 200 or a processor 206 outside of system 200. The results of the pre-computation may be stored in memory 208. So during run-time of system 200 the determination of the risk index for a particular access request becomes a simple table look-up from memory 208. Note that all the desirable properties of $RI_{SL}$ (or $RI_{NK}$) are still valid over $S_f \times O_f$.

Risk mitigation module 210 may be included to decide a best course of action under a given set of circumstances. Mitigation action may be restricted based on the application and type of environment. Therefore, policies and actions will be selected from a finite set. Mitigation module 210 may also be employed as a warning system for identifying potential risks and suggesting a course of action. An input device 240 may be employed to submit a request for access in system 200.

The request or requests can be compared to determine which requested access is more risky than the other. Using these principles, formulas or algorithms can be devised to compute risk indices which are relative measurements of risk such that a larger risk index indicates a higher level of risk as computed by risk index module 222.

The Fuzzy MLS model 202 can make a decision based on these risk indices because the range of risk indices can be calibrated to associate different risk indices with different risk mitigation measures. For a risk index, the calibration process performed by comparison module 244 examines the parameters of the access request that are used to produce the index and determines the perceived level of risk associated with the index to indicate one of the following conditions:

1) risk is too high and the access request should be denied;
2) risk is low enough so that access request can be granted (allow) without further actions; or
3) the risk is not too high and the access request can be granted if the risk can be reduced to an acceptable level by applying a certain risk mitigation measure against the access. The exact risk mitigation measure is determined based on the perceived level of risk by mitigation module 210.

The fuzzy MLS model 202 also allows the perceived levels of risk associated with different accesses to be accumulated so that total level of perceived risk as a result of accesses to information of an application or even an IT (information technology) system can be determined and such risk can also be capped to be below an acceptable level.

The fuzzy MLS model 202 provides much more flexibility in making access control decisions compared to traditional MAC model while still keep the risk associated with accesses to information at an acceptable level.

The following may be employed to set up the access control system 200 with the fuzzy MLS model 202.

1. Determine the risk-contributing factors (dimension). Each dimension assigns a measurement to a subject 232 or an object 230. For example, for the "information sensitivity" dimension, a subject and an object are assigned a "sensitivity level" which indicated how sensitive the information is.

2. For each dimension, define a formula or a method that computes a risk index using a subject's measurement, an object's measurement and optionally other relevant parameters such as the direction of the flow of information (from the subject to the object or from the object to the subject) or the mode of the requested access. The subject and the object are the ones involved in an access request; in other words, the subject requests to access the object in certain way. This may be performed by risk index module 222.

3. For each dimension, determine a "Hard Boundary" (HB) such that a risk index greater that is greater than or equal to the HB indicates a risk that is too high and the access should be denied. The Hard Boundary can be infinity to indicate no risk in this dimension is considered too high. The hard boundaries are stored in comparison module 244.

4. For each dimension, determine a "Soft Boundary" (SB) such that a risk index that is less than or equal to the SB indicates a risk that is low enough so no further action regarding this dimension for this requested access need to be taken. Of course, the SB should be less than or equal to the HB. The soft boundaries are stored in comparison module 244.

For a dimension, the range between its HB and SB is the flexibility provided by the fuzzy MLS model in this dimension. If the SB is equal to the HB, then it means there is no flexibility in this dimension.

5. For each dimension, determine a set of one or more risk mitigation measures in mitigation module 210; and for each risk mitigation measure m, determine its effectiveness as mapping $e_m$ from one risk index to another risk index such that for a risk index RI, $e_m(RI)$ is less then or equal to RI. A combination of two or more risk mitigation measures should generally be treated as a new risk mitigation measure because the effectiveness of the combination would depend heavily on its component measures and the way they are combined.

6. Determine a way to combine risk indices from all dimensions to produce an assessment of the overall risk associated with the requested access. This is optional although it is desirable, and may be performed by the risk index module 222, the transformation module 224 or the comparison module 244.

The configuration of the access control system 200 is operational. When a subject requests to access an object in certain modes (ways), an access control decision regarding this request is made through the following way:

For the requested access and for a dimension, the risk index, RI, is computed by risk index module and a comparison is performed by module 244, then:

I. If the index is greater than or equal the HB of the dimension, deny the request.
 II. If the index is between the HB and the SB of the dimension and there is a risk mitigation measure m such that $e_m(RI)$ is less then the SB for the dimension, choose the measure m to be applied against the access.

If no such risk mitigation measure can be found, deny the request. If more than one such measure can be found, then any one can be chosen but usually it would be preferable to choose one with a lower cost. Note that a measure may be effective in more than one dimension and this factor should be taken into consideration when choosing a risk mitigation measure; an expensive measure that is effective in many dimensions may result in lower total cost than choosing cheaper measure that is effective in only one dimension.

III. Go to the next dimension and repeat until all dimensions are gone through.
 IV. Determine the overall risk associated with requested access if a way to assess the overall risk is determined. The overall risk should be assessed assuming all the chosen risk mitigation measures are applied by trying to choose more effective risk mitigation measures using mitigation module 210.
 V. Allow the request but mandate all risk mitigations measures chosen should be applied against the access.

Figure 5:
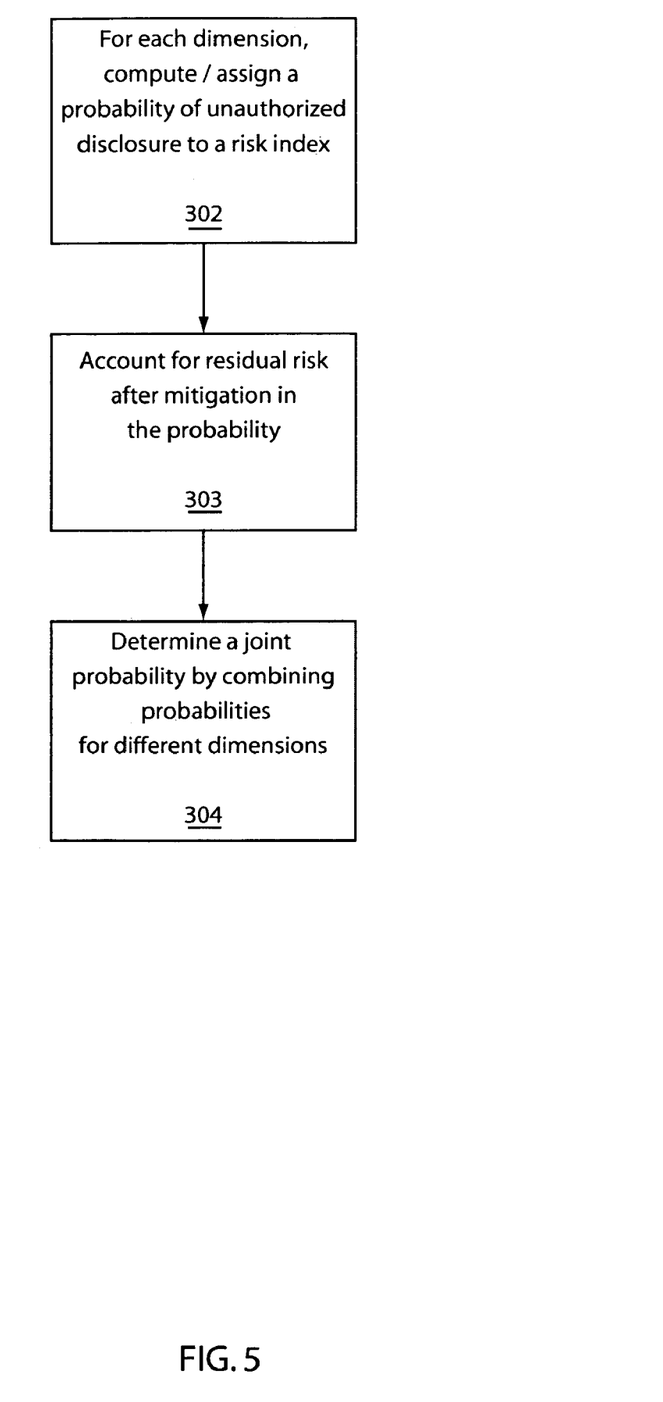
FIG. 5 is a block/flow diagram showing an probability determination from a risk index in accordance with an illustrative embodiment.

Referring to FIG. 5, blocks 26 (FIG. 1) and 116 (FIG. 3) refer to combining risk indices from different dimensions. One goal of combining risk indices from different dimensions is to compute an overall probability of unauthorized disclosure in formula 1 as a function of these indices and thus to compute the risk. This function may be very hard to determine in practice. However, a way to approximate the distribution under certain assumptions can be performed. The approximation assigns higher probability to intuitively more risky situations.

One approach includes the following:

In block 302, for each dimension compute or assign probabilities of unauthorized disclosures to risk indices from that dimension (D). For each dimension, imagine a random process which takes a risk index as input and outputs a 0/1 random variable such that the value 1 means an unauthorized disclosure will happen as the result of the risk from that dimension. The probability distribution of the random variable is the $Prob_D$ function (formula 2) discussed above.

A boundary range can also be defined in terms of risk indices or corresponding probabilities for a dimension such that an index above the range is unacceptable, below the range is acceptable and in the range is acceptable with mitigation measures. Also, It should be noted that a joint probability can be computed by combining probabilities from all the dimensions and a boundary range can also be defined in terms of the joint probabilities.

In block 303, if a risk mitigation measure is applied, then the residual risk index after mitigation ($e_m(RI)$) should be used when evaluating $Prob_D$; i.e., evaluating $Prob_D(e_m(RI))$ By examining or even by conjecturing the relationship among $Prob_D$'s of different dimensions, their joint probability can be computed in block 304, as the final probability of unauthorized disclosure.

This approach is a process of making (educated) guesses. However, as stated, one goal is not to have accurate probabilities but to have risk estimations that are commensurate with intuition and common sense so a larger portion of limited resources are applied to mitigate more risky situations so as to increase the chance of well-being and survival.

An illustrative example for combining risk indices from sensitivity levels and need-to-know will now be presented. Sensitivity levels may be viewed as one dimension and each category as one dimension. One choice for $Prob_D$ is the sigmoid function. Let RI be the risk index and $RI \in (0; +\infty)$, then $$Prob_D(RI)=1/(1+\exp((-k)\times(RI-\text{mid}))) \qquad (13)$$

The value of this function (formula (13)) increases very slowly when RI is much smaller than mid, it increases much faster when RI is closer to mid and saturates as RI becomes much larger than mid. The value "mid" is the risk index value where the probability is deemed to be 0.5; it is a tunable parameter. The value k is also a tunable parameter that controls the slope of the function. A dimension may have its own values for mid and k.

The choice of mid has a significant effect on the probabilities computed and that the probabilities become 1 (or very close to 1) when the value of an object is at least two orders of magnitude or a hundred times larger than the trustworthiness of the subject. This observation is consistent with our pessimistic view of human nature. It should be noted that by choosing formula 13 the first requirement for $Prob_D$ discussed above is changed to be RI $$lim_{RI \to 0+} Prob_D(RI) \approx 0$$

This is fine since the risk at such a low level is usually well within the acceptable range. If it is desirable to take risk mitigation into consideration, the formula (13) becomes:

$$Prob_D(RI)=1/(1+exp((-k) \times (e_m(RI)-mid))) \quad (14)$$

where $e_m(RI)$ is the residual risk after mitigation (see block 303).

A further assumption may be made that the $Prob_D$ for sensitivity levels and the $Prob_D$ for a category are independent of each other. The rationale behind this assumption includes:

View the risk computed from sensitivity levels as the "risk of being tempted", in other words, the risk of a subject disclosing sensitive information intentionally for its own gain. The more sensitive the information or the less trustworthy the subject, the higher the risk is. The risk computed from a category may be viewed as the risk of "inadvertent disclosure or use". It is generally very hard to divide a piece of information into the "need-to-know" and "no-need-to-know" partitions while still maintaining the original context of the information. Therefore, once a subject, even a very trusted one, absorbs some information, which it has no (strong) need-to-know, there is a chance the subject will inadvertently disclose or use the information.

A practical example that highlights this kind of risk includes "Chinese Walls", which are often used to isolate different groups of programmers, where each group has the need to access its own set of specific intellectual property.

A simplifying assumption may be made that the object is monolithic and therefore information of all categories will be disclosed together if the content of the object is disclosed. Thus, the probability of inadvertent disclosure, $PROB_{CAT}$ is:

$$PROB_{CAT}=max\{Prob_{Ci}(RI_{Ci})|C_i \text{ is a category; } 1 \leq i \leq n\} \quad (15)$$

Call the value of $Prob_D$ computed from sensitivity levels, $PROB_{SL}$, and the probability of unauthorized disclosure in formula 1, $PROB_{UAD}$, then:

$$PROB_{UAD}=PROB_{SL}+PROB_{CAT}-PROB_{SL} \times PROB_{CAT} \quad (16)$$

Formula 1 can be evaluated with $PROB_{UAD}$ now. If $Prob_{ci}$ is the same for all categories, then $PROB_{CAT}$ can be easily computed by feeding $Prob_{Ci}$ the largest risk index among the categories.

A general approach for combining risk indices from multiple dimensions to produce a single risk value may be performed in many ways. It seems worthwhile to try to divide the dimensions into groups such that the risk relationship among members of the same group is known or can be conjectured. Then, the joint probability can be computed for each group, and the final $PROB_{UAD}$ can be computed by assuming the groups are independent of one another.

Risk Mitigation Measures

For risk indices to be meaningful, they should be translated in to concrete decisions: deny, allow or allow with risk mitigation measures. The goal of risk mitigation measures is to mitigate risk so the risk will stay within an acceptable level, e.g., to be below the soft boundary. From $RI_{SL}$ (formula 7), the following observation may be made on risk mitigation that is consistent with intuition.

To reduce the risk, we would need to reduce the value of the object; i.e., to decrease ol. Such reduction usually implies changing the content of an object to make it less sensitive. In MLS terminology, such change is done by a downgrader.

To reduce the risk, we need to increase the trustworthiness of the subject; i.e., to increase sl. In general, a subject cannot be made more trustworthy instantly. But measures can be taken to make the subject less likely to do the wrong things. Such measures usually fall into two categories: strong deterrence and detection and prevention which are discussed below.

In addition, prevent, repair or limit the damages may also be attempted. The following types of risk mitigation measures may be implemented:

Prevention: to prevent real damage from happening. Examples of this kind of measures are sandboxing and other types of intrusion prevention systems.

Repair/Recovery: to detect that damages have happened and to repair and recover from the damages. Examples of this kind of measures are combinations of auditing, audit log analysis, software patching, back-up and restoration.

Deterrence: to provide (strong) disincentives for wrong-doings. For example, detailed auditing and audit log analysis may be used to identify the wrong-doers and set the stage for administrative or legal action.

Limiting Damage: to assume that detrimental things will happen and take precautionary measures to limit the potential damage. Examples include limiting the input and output rate of a process, reduced scheduling priority, etc.

Value Reduction: to use downgraders. One would generally prefer preventive measures. However, no such measures or any combination of them would be perfect, so other measures are necessary to ensure or just to increase the survivability of a system.

Common risk mitigation measures are illustratively described herein. While risk mitigation measures are likely to be highly dependent on the particular operation environment, the application scenario and the dimension, some measures that may be generally applicable include:

Intrusion Detection and Intrusion Prevention systems (IDS/IPS): this has been a field of active research for many years. Many commercial and academic products or systems are available, e.g., see the BlueBox IDS/IPS in *BlueBox: A Policy-Driven, Host-Based Intrusion Detection System* by Suresh N. Chari and Pau-Chen Cheng, ACM Transactions on Information and System Security, 6(2), May 2003.

Rate Limiting: limit the rate a subject can consume or output information to limit the magnitude of potential information leakage.

Auditing during and after an access. The coverage of the auditing could include types of activities, parameters/attributes of these activities, resolution of time stamps of activities, etc.

Decrease the access privileges of the subject after an access. This could mean (temporarily) reducing some of the subject's relevance to some categories, (temporarily) decreasing the subject's sensitivity level so subsequent access from the subject would be deemed more risky and need more effective risk mitigation measures, etc.

Decrease the access privileges of the subject if the subject has already accessed a large amount of sensitive information. This means if a subject knows too much, then it becomes a potential weak point and therefore a higher level of precaution is needed against its actions.

Referring again to FIG. 4, mitigation module 210 may include one or more mitigation models 420 for risk mitigation measures. A very simple model will now be described for illustrative purposes for a risk mitigation measure. A risk mitigation measure m is assigned a mapping $e_m$ that represents the effectiveness of m; $e_m$ maps a risk index, RI, to another risk index such that $0 < e_m(RI) \leq RI$. All risk indices may be assumed to be greater than zero. The effectiveness of combining two measures depends on the nature of the measures and the way they are combined. A combination of measures should be considered a new measure and be assigned its own effectiveness. In other words, if two measures m1 and m2 are applied together, the combined effectiveness cannot be assumed to be $e_{m2}(e_{m1}(RI))$.

A risk mitigation measure could have a cost 422 associated with it. The costs 422 could be used to select a measure if more than one measure can meet the risk reduction requirement.

In a real-world environment, e.g., in a security access system 200, things may still happen even if risk mitigation measures are taken because the risk mitigation measures are never 100% effective and their effectiveness could be over-estimated. So it would be prudent to have some safe guards in place such that bad things could be detected and their progress be stopped as soon as possible. Thus, the damages could still be confined although the damages may be more serious than expected. Such safe guards provide the opportunity to continuously fine-tune the risk mitigation measures without the very unpleasant wake-up calls from catastrophic incidents.

To facilitate the fine-tuning process and to deal with the damage caused by inaccurate estimates, the risk mitigation measures implemented by module or system 210 and the overall system design should have at least some of the following desirable characteristics:

1) detect damages before it is too late. This may mean, for example, real-time IDS/IPS or continuous analysis of audit logs in the background.

2) be able to either confine the damage or at least enable the system to survive and recover from such damage. For example, auditing may not prevent damages; but an audit log with enough information can tell what happened so an administrator can determine the appropriate steps for repair and recovery.

3) produce and retain enough information to show how a risk mitigation decision is made. Such information will be the input for the fine-tuning process.

The formula for computing $RI_{HB}$ and $RI_{SB}$ and the implications of these boundaries on risk mitigation measures will now be described. Let V denote the object value and B denote the boundary on risk, the following inequality is to be satisfied for an access to be granted, $$V \times (\text{probability of unauthorized disclosure}) < B \qquad (17)$$

Using formula 13:

$$(1/D)\ln(1/(V/B-1)) + \text{mid} > (RI) \qquad (18)$$

From formula 18, we can observe that:

The tolerance for risk is very low when V>>B. This is because V/B would be very large and therefore $\ln(1/(V/B-1))$ would become much less than zero. In fact, B must be greater than $V/(1+\exp(D \times \text{mid}))$ for RI to stay positive. A relatively small B implies only very trusted subjects should be allowed to access an object with a high value or highly effective risk mitigation measures should be used to reduce RI.

The tolerance for risk is much higher when V is close to B (where $\ln(1/(V/B-1))$ would be closer to zero). The higher tolerance implies less trusted subjects could be allowed to access an object with a lower value, or only medium effective risk mitigation measures or no risk mitigation are needed.

The larger mid is, the larger the risk tolerance. Of course, the risk is always below the boundary if $V \leq B$.

Mitigation module 210 therefore determines based on computed RI's whether to "allow", "deny", or "allow but with certain risk mitigation measures to be taken against the access".

The fuzzy MLS model and risk management system 200 (FIG. 4) may include many features. Some of the features to be considered are enumerated here. System 200 may need to make a determination of subject/object clearance/sensitivity levels and relevance (need-to-know). This determination may be made automatically or semi-automatically, including tracking the behavior and usage patterns to fine-tune the levels and relevance assigned subjects and objects.

Uncertainty in subject/object clearance/sensitivity levels and relevance can be dealt with by a process of estimation for determining these levels and relevance. There may be built-in uncertainty in the outcomes. A good security policy model should take the uncertainty into account.

Evaluation of the effectiveness and cost of risk mitigation measures should be considered to make automatic or semi-automatic evaluations, including fine-tuning the effectiveness and cost over time.

Transformations from risk indices to probabilities should be determined and fine-tuned, and risk indices computed from other dimensions from the ones described above, e.g., integrity. Other risk indices and ways of combining them may be considered, and new and improved risk mitigation measures may be determined. Estimates and management of aggregated risk should be performed, for example, what to do if too much top-secret data are placed into one file.

Computing Risk Indices and Probablities Example:

A hypothetical scenario will be presented to demonstrate how formulas for computing risk indices and their corresponding probabilities can be determined. The scenario will include the basic settings and assumptions, formulas for computing risk indices from sensitivity levels and need-to-know, and formulas for computing probabilities from risk indices.

The scenario involves a very reputable and prestigious investment firm which has access to a lot of very sensitive and privileged information about its clients and the companies it invests in. An unauthorized disclosure of any such information would potentially cause great damage to the firm, such as lost business opportunities, broken relationships with major clients, legal liabilities, and ultimately the firm's most important asset its reputation and credibility. Therefore, providing its employees access to such information carries great risk yet such access is necessary for the employees to do their jobs. The firm implements a risk management system based on information sensitivity and need-to-know.

Sensitivity levels, risk indices and probabilities are determined. The first step is to determine how to assign sensitivity levels to objects and subjects. To this end, a rationale is provided for the sensitivity levels. First, the firm determines that the risk associated with an access to information should be represented as the expected value of loss/damage:

$$\text{risk} = (\text{value of information}) \times (\text{probability of information misuse or compromise}) \qquad (19)$$

The value of a piece of information is the value of potential damage that will be incurred if the information is misused or compromised. It is assumed that the investment firm has a way to estimate the values of objects based on their information content.

The rationale for computing the probability of misuse/compromise will now be shown. This rationale will lead to the rationale for sensitivity levels and $RI_{SL}$. It should be noted that there are other reasonable definitions of value such as one based on usefulness. The concern here is risk and potential damage which is the basis for selecting the present definition for sensitivity levels.

If the misuse or compromise of a piece of information incurs no damage, then it could be made public and declared "risk free".

The investment firm takes a paranoid and pessimistic view that every person has a price. In other words, the trust placed on any person is limited. The trust is expressed in the form: S is trusted to handle at most T amount of dollars. The intuition is that if S is given an object whose value is greater than T, the probability of misuse/compromise increases quickly as the value of the object increases. If the object's value is less than T, the probability decreases quickly as the value decreases. If V is the value of the object, then the following formula is consistent with the intuition:

$$\text{probability}(V,T)=1-\exp(-(V/T)) \quad (20)$$

There are two problems with formula 20:

1) The same V/T ratio generates the same probability. In reality, one would think a $1,000,000 object is much more tempting than a $10,000 object. Therefore the firm wants to emphasize the risk when V is larger. 2) The formula (20) does not capture the notion of a risk threshold. If an object's value is close to or larger than the risk threshold, then any access to the object is considered extremely risky and should be handled with extreme caution if the access would be permitted at all. In which case, the firm wants the value of probability (V,T) to be 1 regardless of the value of T so as to highlight the extreme risk.

To address these two problems, Let M=risk threshold, then:

$$\text{probability}(V, T) = \begin{cases} 1 - \exp(-(V/T)/\log_{10}(M/V)) & \text{if } V < M \\ 1 & \text{if } V \geq M \end{cases} \quad (21)$$

The term $\log_{10}(M/V)$ in the denominator of the exponent emphasizes the risk when V is large and de-emphasizes the risk when V is small. Using a log function provides that the emphasis on larger V would not be too strong, and effects the way sensitivity levels are computed from values and how $RI_{SL}$ is derived.

The investment firm is not counting nickels and dimes or even a few dollars. The estimate and comparison of value is more in terms of "orders of magnitude". For example, $15,000 is an order of magnitude larger than $1,200. Therefore, it is natural to represent "orders of magnitude" of a value using $\log_{10}$ (value). The formula 21 can be represented in the following way:

Let $ol=\log_{10}V$, $sl=\log_{10}T$, $m=\log_{10}M$, $a=10$, then $$(V/T)/\log_{10}(M/V)=a^{-(sl-ol)}/(m-ol)=RI_{SL}(sl, ol) \quad (22)$$

This is the rationale behind formula 7 and provides an illustrative example of the meaning of sensitivity levels; i.e., sensitivity level=$\log_{10}$(value).

As an example, the risk indices ($RI_{SL}$ values) and their corresponding probabilities without risk reduction can be computed. The probability becomes 1 (or very close to 1) when the value of an object is at least two orders of magnitude, or a hundred times larger than the trustworthiness of the subject. This result is consistent with our pessimistic view of human nature. The formula for risk indices, namely $RI_{SL}$, has been derived from the formulas that compute probabilities of "bad things". However, once $RI_{SL}$ is derived and proven to have nice desirable properties, it is possible to define alternate formulas to compute the probability in terms of risk indices.

One such alternative is included as follows:

$$\text{probability}(RI)=1/(1+\exp((-k)\times(RI-\text{mid}))) \quad (23)$$

Note that probability (mid)=0.5 for formula 23; the exact value of mid would have to be determined through heuristics or statistics. Formula 23 is a sigmoidal function that may be employed in Fuzzy Logic and artificial neural networks.

The assignment of sensitivity levels and estimation of risk resulting from information flow between two sensitivity levels has been described. Estimation of risk resulting from information flow between two levels of need-to-know will now be described. The "Category and Relevance" concept will be used to develop a set of formulas that can be used to do the risk estimation. The simplified view of this kind of risk results from a subject's inadvertent use of information whose relevance is more than the subject's need-to-know. The word "inadvertent" is emphasized to make it clear that the risk of malicious misuse of information is not considered in this example; such risk is already covered above.

Once a piece of information is in a person's brain (or in a process's address space), then it is generally very hard, if not impossible to absolutely guarantee that the information will not be used in unintended ways, and the more relevant the information, the more likely such uses will happen. For a category C, the likelihood of inadvertent use should reflect the ratio $r_o/r_s$=(object relevance)/(subject relevance) and be biased toward large $r_o$. Therefore, a modified version of formula 22 is chosen to be the formula for risk indices:

Assuming that relevance to a category is in the range [1,M]; 1 means "totally irrelevant" and M means "the most relevant". Let $\epsilon$ be a small positive number, then $$RI_{NK}(r_s, r_o)=(r_o/r_s)/\log_{10}((M+\epsilon)/r_o) \quad (24)$$

The range starts from 1 instead of 0 so as to avoid division-by-zero; it is also meant to avoid a large $RI_{NK}(r_s; r_o)$ value when $r_o$ is small and $r_s$ is very small. The term "+$\epsilon$" is meant to avoid division by zero.

Alternative View on Risk from Need-to-Know

Figure 6:
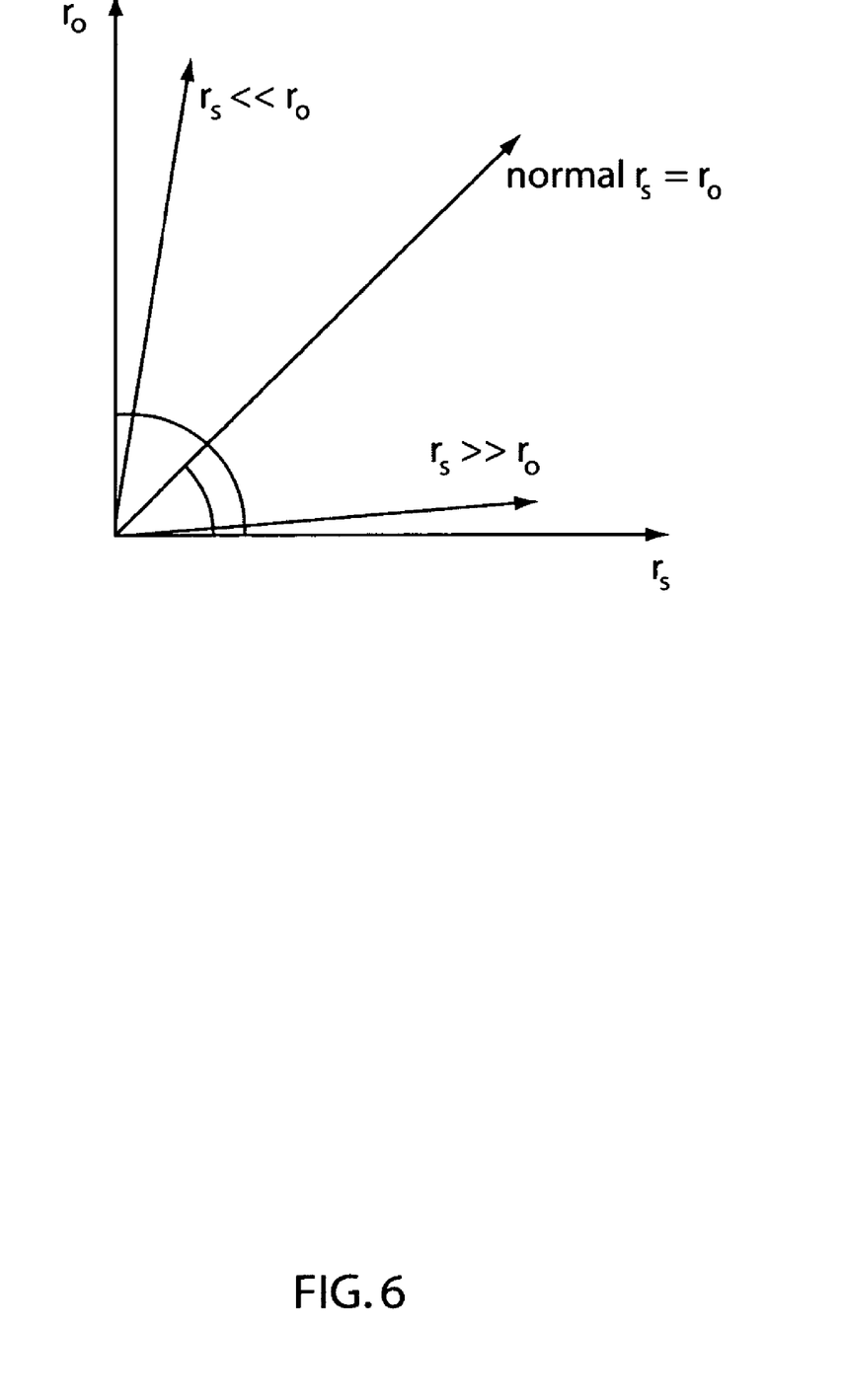
FIG. 6 is a diagram graphical showing the dimension of relevance in two-dimensional space.

Two alternate views on computing risk indices from need-to-know based on the "category and relevance" model are presented. The first is a two-dimensional view of category and relevance. Let the values of $r_s$ and $r_o$ represent the X and Y coordinates in a two-dimensional space as shown in FIG. 6. Then, for an access and a category C, we have a vector $v_{soC}=(r_s, r_o)$ Referring to FIG. 6, let $\theta_{soC}$ be the angle between $v_{soC}$ and the X axis and $m_{soC}$ be the magnitude of $v_{soC}$. If the access with respect to C is normal, then $\theta_{soC}=\pi/4$. So we could use the value $\gamma_{soC}=\theta_{soC}-\pi/4$ to estimate the relative degree of abnormality and $m_{soC}$ to estimate the amount information (or the lack of it if $r_s>>r_o$) involved in the abnormality. If $r_s<<r_o$, then $\theta_{soC}$ approaches $\pi/2$. If $r_s<<r_o$, then $\theta_{soC}$ approaches 0. If a lump representation is preferred, then we could just look at the sum vector $\Sigma_{C \text{ is a category}} v_{soC}$.

Of course, when using the lump representation, we should also look at the mean deviation of $\theta_{soC}$ from $\pi/4$ which is $(\Sigma_{C \text{ is a category}}|\gamma_{soC}|)/(\text{number of categories})$; so we would not be fooled by the case when two abnormal vectors are lumped together and become a normal one.

Computing the angle θ from $(r_s, r_o)$ may be too time-consuming during run time. However, given that θ is determined only by the ratio $r_o/r_s$, we can do a pre-computation by calibrating the arc from 0 to π/2 and build a table:

1. Divide the arc into N small arcs of equal length, so the ith small arc is at the angle (π/2)(i/N).

2. For each small arc i, compute the value $r_o/(r_o+r_s)$, enter the value and (π/2)(i/N) as a pair into the table.

We use $r_o/(r_o+r_s)$ instead of $r_o/r_s$ to avoid division-by-zero and overflow when $r_s$ is too small. We could define θ to be π/4 when $r_s=r_o=0$, and thus implies a vector with zero magnitude and its θ equals π/4.

There are some potential advantages by treating each category as a separate dimension and view the problem in a multi-dimensional space.

If there are N categories of interest numbered from 1 to N, then each subject and each object is assigned an N-dimensional relevance vector $v_r$ such that its ith element $v_{ri}$ is the subject's or the object's relevance to category i. If a subject s is initially assigned a relevance vector $v_{sr}$ and its accesses to objects are recorded over a period of time, then the relevance vectors of the objects accessed by s can be mined and divided into clusters. These clusters would represent the access pattern of s and may be used in several ways:

By examining the discrepancy between $v_{sr}$ and the pattern, one could either adjust $v_{sr}$ according to the pattern or determine if any actions need to be taken against s if the discrepancy is deemed too large.

By computing the centers of the clusters, one could use the set of these centers to replace $v_{sr}$. When s makes a request to access an object o with relevance vector $v_{or}$, the distances between $v_{or}$ and each center are computed and the center $c_s$ with the shortest distance to $v_{or}$ can be considered the best excuse for s to access o. The risk index can be determined from this shortest distance or it can be determined by plotting the vectors $(c_{si}, v_{ori})$ on the $r_s \times r_o$ plain and examine the θ angles as discussed above.

Figure 7:
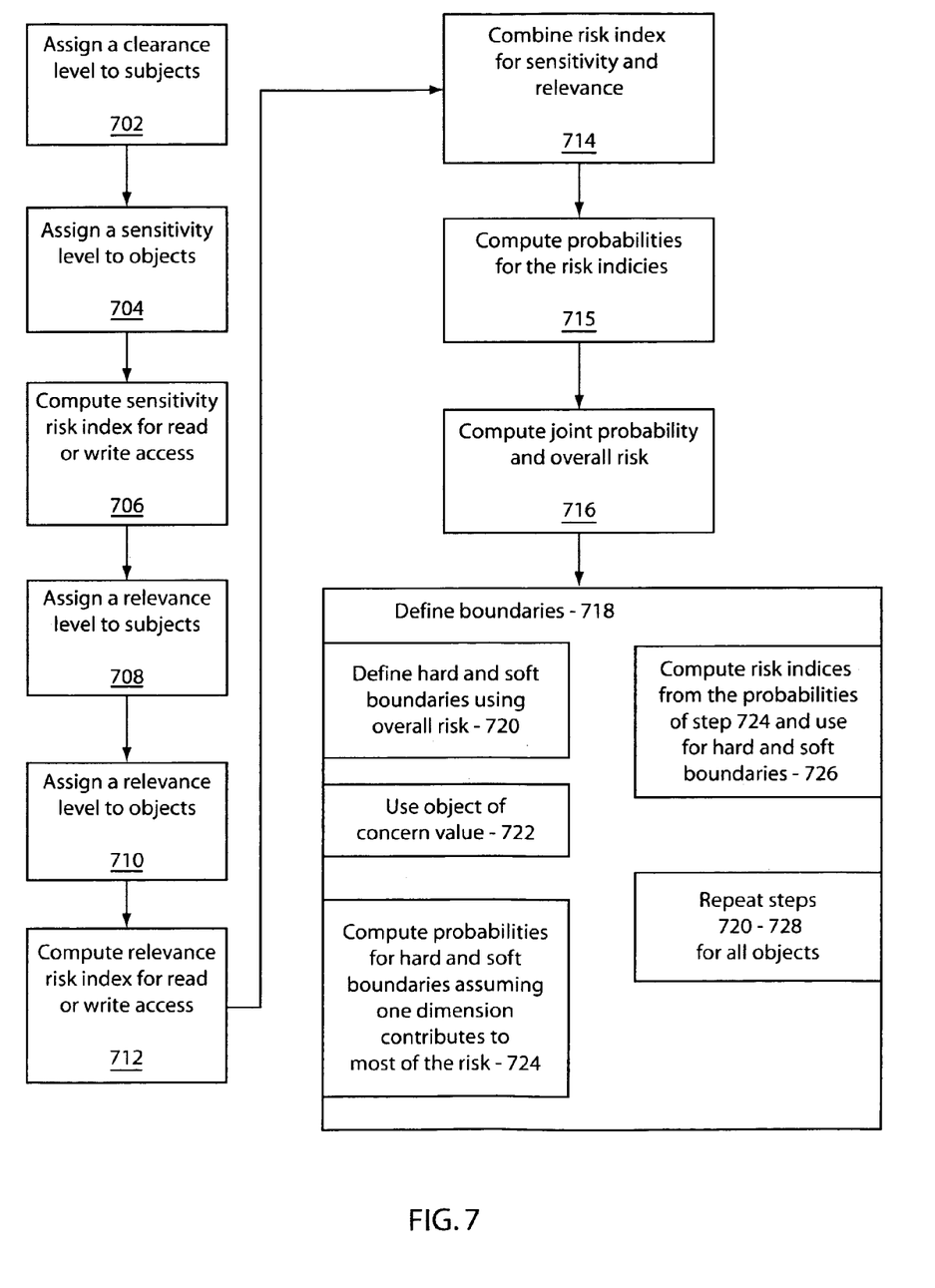
FIG. 7 is a block/flow diagram showing an illustrative example for making access decisions including the determination of boundaries in accordance with an illustrative embodiment.

Referring to FIG. 7, an illustrative embodiment will be described where hard and soft boundaries are determined based on a per-object value. In block 702, a subject is assigned a "clearance level" which is a number between zero and $C_m$ that indicates the degree of trust placed on the subject. Let's use "cl" to denote a clearance level. Note that the $C_m$ is the maximum trust that the embodiment would place on a subject and it does not mean "absolute trust".

In block 704, an object is assigned a "sensitivity level" which is a number between zero and $O_m$ that indicates the degree of sensitivity of the object. Let's use "ol" to denote a sensitivity level.

In block 706, the formula to compute a risk index in the "information sensitivity" dimension for a "read" access may include:

$$RI = a^{-(cl-ol)/(m-ol)}$$

the number "a" can be any number that is greater than one. In this embodiment, we choose a to be 10. The number "m" can be any number that is greater than $O_m$. In this embodiment we chose m to be $(O_m+1)$. The roles of cl and ol are switched for a "write access. Also, the number m should be greater than $C_m$ in this case. In other words, the roles of subject and object should be switched for a "write" access when applying the formula.

Each category is a dimension. For each category:

In block 708, a subject is assigned a "relevance level" which is a number between zero and $N_m$ that indicates the degree of need the subject has to access information in the category. Let's use "nl" to denote this subject relevance level.

In block 710, an object is assigned a "relevance level" which is a number between zero and $R_m$ that indicates the degree of relevance that object has to the category. Let's use "rl" to denote this object relevance level.

In block 712, the formula to compute a risk index for relevance in a category for a "read" access is:

$$RI = w_i(rl/nl)/\log_{10}(R_L/rl)$$

the number "$R_L$" can be any number that is greater than $R_m$. In this embodiment, we chose m to be $(R_m+1)$. w is a per-category weight for a category i. The roles of nl and rl are switched for a "write" access. Also, the number $R_L$ should be greater than $N_m$, in this case. In other words, the roles of subject and object should be switched for a "write" access when applying the formula.

Risk may be combined in block 714. To combine risk, in this example, indices are combined from different dimensions to produce an assessment of the overall risk. The following concepts are defined:

An object has a value which is a measurement of the damage if the object is disclosed in an unauthorized way e.g., a way that violates the fuzzy MLS model and the hard and soft boundaries. The value could be monetary or be measured in other units.

A new formula is defined to characterize a random process that takes a risk index as input and produces a Boolean output where a "true" output means an unauthorized disclosure will happen. The formula computes the probability in block 715 for a "true" output. The formula may include:

$$\text{probability of an unauthorized disclosure} = 1/(1+\exp(-k \times (RI-\text{mid}))) \quad (25)$$

The number k is a positive number and is a tunable parameter. The number "mid' is a positive number and is a tunable parameter; it is the risk index where the probability is deemed to be 0.5.

It is possible to use other formulas to compute these probabilities. Any such formula may have the following properties:

i. This formula is monotonically increasing with respect to RI.

ii. The formula's range is between 0 and 1 ([0,1])

iii. The formula's value should approach as RI approaches infinity.

The following assumptions may be made:

A) An object is monolithic and can only be disclosed in its entirety. B) The probability computed for the "information sensitivity" dimension is independent of the probability computed for a category. C) Based on the assumptions, the overall joint probability for an unauthorized disclosure is $P_u$ such that:

$$P_u = P_s + P_{Cmax} - P_s \times P_{Cmax} \quad (26)$$

$P_s$ is the probability computed for the "information sensitivity" dimension. $P_{Cmax}$ is the probability computed using the maximum risk index among all the Categories. This probability is chosen based on assumption A. This formula assumes that $P_s$ and $P_{max}$ are independent of each other based on assumption B.

The overall risk is the expected value of damage; in other words:

$$\text{overall risk} = (\text{value of the object}) \times P_u \quad (27).$$

In block 716 the overall probability and the overall risk are computed.

In block 718, boundaries are defined. There are many possible ways to determine the hard and soft boundaries for a dimension; a nonexclusive list is given below.

Look at each dimension individually. For a dimension, look at the range of its risk indices and examine the input parameters that produce these indices to determine where the hard and soft boundaries should be.

Use the "overall risk" (formula (27)) as a benchmark as a starting point, define uniform hard and soft boundaries for all dimensions by:

Defining a hard boundary and a soft boundary on the overall risk in block 720.

Picking an object value that is high enough to be of concern in block 722.

assuming the overall risk is contributed by just one dimension, use overall risk formula (27) in block 724 and the object value picked in step 722 to compute the two probabilities ($P_u$) corresponding to the hard and soft boundaries; in other words, $$\text{boundary} > (\text{value of the object}) \times P_u \quad (28)$$

In block 726, use the two probabilities computed in step 724 and the formula (25) to compute the two corresponding risk indices. These two indices can be used as the hard and soft boundaries or they can be increased some to take into account the accumulation effect of formula (26).

In block 728, go to step 722 and pick another object value of concern and repeat steps until all object values of concern are gone through.

Here it is assumed that there is a threshold object value such that accesses to an object whose value is greater than or equal to the threshold is considered too risky and ought to be handled with extreme caution and special care that is outside the access control system.

The steps 720-728 outlined above will need the hard and soft boundaries for risk indices to be determined on a per-object-value basis. This is not too cumbersome in practice since it is very likely that the values of objects will be quantized into a finite set of numbers in practice. A table of (hard boundary, soft boundary) pairs indexed by object values can be pre-computed in an on-line operation and can use a simple table look-up.

Having described preferred embodiments of a system and method for fuzzy multi-level security (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for making access control decisions comprising the steps of:

computing a risk index for a plurality of dimensions which contribute to risk in a computer related device;

computing a probability of an unauthorized disclosure of information for each dimension for the risk index;

determining whether the probability falls with a boundary range defined for the probability for each dimension such that probabilities above the range are unacceptable, below the range are acceptable and in the range are acceptable with mitigation measures wherein the boundary range has a hard boundary above which the probability of unauthorized disclosure is unacceptable, and a soft boundary below which the probability of unauthorized disclosure is acceptable;

determining a residual risk after applying a mitigation measure by mapping effectiveness of performing the mitigation measures to determine the residual risk; and selecting a mitigation measure in accordance with the residual probability to reduce a probability of risk.

* * * * *